US009478790B2

(12) United States Patent
Jinno et al.

(10) Patent No.: US 9,478,790 B2
(45) Date of Patent: Oct. 25, 2016

(54) WATER ADDITION PLUG FOR STORAGE BATTERY (71) Applicant: GS Yuasa International Ltd., Kyoto (JP)

(72) Inventors: Shunsuke Jinno, Kyoto (JP); Tomoyuki Enomoto, Kyoto (JP); Tatsuo Nagayasu, Kyoto (JP); Ryoji Okuno, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 353 days.

(21) Appl. No.: 14/351,670

(22) PCT Filed: Oct. 15, 2012

(86) PCT No.: PCT/JP2012/006574
§ 371 (c)(1),
(2) Date: Apr. 14, 2014

(87) PCT Pub. No.: WO2013/073102
PCT Pub. Date: May 23, 2013

(65) Prior Publication Data
US 2014/0242431 A1 Aug. 28, 2014

(30) Foreign Application Priority Data

Nov. 17, 2011 (JP) ................. 2011-251810
Nov. 17, 2011 (JP) ................. 2011-251811
Nov. 17, 2011 (JP) ................. 2011-251812
Nov. 17, 2011 (JP) ................. 2011-251813

(51) Int. Cl.
*H01M 2/36* (2006.01)
*H01M 10/06* (2006.01)

(52) U.S. Cl.
CPC ............ *H01M 2/362* (2013.01); *H01M 2/365* (2013.01); *H01M 10/06* (2013.01); *H01M 2220/20* (2013.01); *Y02E 60/126* (2013.01); *Y02T 10/7016* (2013.01)

(58) Field of Classification Search
CPC ..................................................... H01M 2/362
USPC ........................................ 429/72–79; 137/260
See application file for complete search history.

(56) References Cited

U.S. PATENT DOCUMENTS 4,165,769 A   8/1979  Hoffmann
6,227,229 B1  5/2001  Campau
(Continued)

FOREIGN PATENT DOCUMENTS

CN   201508870    6/2010
EP     0041334   12/1981
(Continued)

OTHER PUBLICATIONS

International Search Report dated Jan. 15, 2013 filed in PCT/JP2012/006574.
(Continued)

*Primary Examiner* — Maria J Laios
(74) *Attorney, Agent, or Firm* — Rankin, Hill & Clark LLP (57) ABSTRACT Provided is a water addition plug for a storage battery, which is for carrying out water addition into a container of the storage battery. The water addition plug comprising a water addition plug main body having a water supply port through which the water is supplied, a water addition port through which the supplied water is discharged into the container, and a valve chest disposed between the water supply port and the water addition port and provided with a first valve and a second valve and a float that moves up and down following an electrolyte level in the container. The first valve comprises a first drain port, which is open to the valve chest and communicates with the water addition port, and a first valve element for closing the first drain port in synchronization with a vertical movement of the float. The second valve comprises a second drain port, which is open to the valve chest and communicates with the water addition port, and a second valve element for closing the second drain port.

15 Claims, 4 Drawing Sheets (56) References Cited

U.S. PATENT DOCUMENTS

| | | | |
|---|---|---|---|
| 6,686,720 B2 | 2/2004 | Mittal et al. | |
| 6,881,513 B2 | 4/2005 | Dasgupta et al. | |
| 6,890,681 B2 | 5/2005 | Mittal et al. | |
| 7,029,786 B2 | 4/2006 | Campau | |
| 7,556,056 B2 * | 7/2009 | Hutchinson | H01M 2/1247 137/260 |
| 7,713,652 B2 | 5/2010 | Hutchinson | |
| 2010/0167109 A1 | 7/2010 | Campau et al. | |

FOREIGN PATENT DOCUMENTS

| | | |
|---|---|---|
| JP | 49-001709 | 1/1974 |
| JP | 52-156341 | 12/1977 |
| JP | 52-164223 | 12/1977 |
| JP | 55-007430 | 1/1980 |
| JP | 57-164966 | 4/1981 |
| JP | 57-17562 | 1/1982 |
| JP | 57-060382 | 4/1982 |
| JP | 57-070669 | 4/1982 |
| JP | 58-66563 | 5/1983 |
| JP | 58-066563 | 5/1983 |
| JP | 58-110967 | 7/1983 |
| JP | 58-147164 | 10/1983 |
| JP | 61-042778 | 3/1986 |
| JP | 61-063766 | 4/1986 |
| JP | 61-063767 | 4/1986 |
| JP | 61-087459 | 6/1986 |
| JP | 02-091154 | 7/1990 |
| JP | 2002-367599 | 12/2002 |
| JP | 2003-109565 | 4/2003 |
| JP | 2004-247302 | 9/2004 |

OTHER PUBLICATIONS

First page of Chinese Office Action dated Jul. 28, 2015 issued in the corresponding Chinese patent application No. 201280040081.7.

* cited by examiner

WATER ADDITION PLUG FOR STORAGE BATTERY

TECHNICAL FIELD

The present invention relates to a water addition plug for a storage battery, which is for adding water into a container of the storage battery.

BACKGROUND ART

Because electrolyte solution in a container of a vented battery reduces due to electrolysis of water and evaporation during use, the vented battery needs to be regularly checked for an electrolyte level and needs to be replenished with purified water. For example, for use in an electric vehicle such as a forklift, an assembled battery formed by a plurality of batteries by arranging the plurality of batteries of electromotive force of 2 V, housing them in a housing box, and connecting them in series to obtain electromotive force of 48 V is used, and adding water to the respective batteries is very troublesome. Therefore, conventionally, water addition plugs attached to the respective batteries are connected by tubes to add water to the batteries at once. There is a water addition plug for collective water addition, which has a function of automatically stopping the addition of the water when a prescribed electrolyte level is restored.

Patent Document 1 describes a water addition plug for a storage battery and having, which has an automatic valve function. In this valve mechanism, a water addition port (corresponding to a drain port in the present invention) is formed in a ceiling of a valve chest in a plug. When an electrolyte level rises to a prescribed level, a valve (corresponding to a valve element in the present invention) interlocked with a float closes the water addition port from below (from a side of the valve chest). Once the valve is closed, the valve is pushed against the water addition port due to water pressure in the valve chest to keep a closed state.

Patent Document 2 describes a water addition plug having drain ports in upper and lower portions of a valve chest. Two valve elements are fixed to a shaft connected to a float and substantially simultaneously close the upper and lower drain ports from below when an electrolyte level rises to a prescribed level.

PRIOR ART DOCUMENTS

Patent Documents

Patent Document 1: JP-U-02-91154
Patent Document 2: U.S. Pat. No. 6,227,229

SUMMARY OF THE INVENTION

Problems to be Solved by the Invention

However, in the water addition plug described in Patent Document 1, when water supply pressure becomes high, the valve is closed to stop the water addition before the electrolyte level rises to the prescribed level in some cases (hereafter referred to as "early closing"). The rise in the water supply pressure is thought to be caused by upward and downward swings of the float due to vibrations of the electrolyte solution surface or pushing up of the valve due to turbulence in a water stream in the valve chest, for example. Once the valve is closed, the valve is pushed against the water addition port due to water pressure in the valve chest to keep the closed state and therefore it is difficult for the valve to return.

On the other hand, in the water addition plug described in Patent Document 2, the drain ports are provided in the upper and lower portions. Therefore, even if turbulence occurs in a water stream in the valve chest, the valve elements are less likely to be pushed up and early closing is less likely to occur. The valve element of the lower valve closes the drain ports from below (from outside the valve chest). Because the drain port is formed by a disc-shaped elastic plate, once the valve is closed, the elastic plate is pushed against the valve element by water pressure in the valve chest to thereby keep the closed state.

However, because the upper and lower valve elements are mounted to the same shaft body and directly interlocked, when the entire water addition plug vibrates greatly, the upper and lower valves are closed simultaneously. Moreover, because of the structure using the disc-shaped elastic plate, it is difficult to increase size of the drain port and it is difficult to lay out the drain port together with other functions such as a specific gravity measurement port and an electrolyte level indicator in the one water addition plug.

The present invention has been made with the above points in view and its object is to provide a water addition plug for a storage battery in which early closing is less likely to occur.

Means for Solving the Problems

In accordance with an aspect of the present invention, there is provided a water addition plug for a storage battery, which is for carrying out water addition into a container of the storage battery, the water addition plug including a water addition plug main body having a water supply port through which the water is supplied, a water addition port through which the supplied water is discharged into the container, and a valve chest disposed between the water supply port and the water addition port and provided with a first valve and a second valve and a float that moves up and down following an electrolyte level in the container. The first valve includes a first drain port, which is open to the valve chest and communicates with the water addition port and a first valve element for closing the first drain port in synchronization with a vertical movement of the float. The second valve includes a second drain port, which is open to the valve chest and communicates with the water addition port and a second valve element for closing the second drain port.

With the water addition plug for the storage battery according to the invention, the two valves are provided. Even when one of the valves is closed, the other valve is not closed, because there is a lag between times when the two drain ports are closed. As a result, the one valve can return and is less likely to be closed early.

Preferably, the first valve element and the second valve element are not directly interlocked with each other. In this manner, because the first valve element and the second valve element are not directly interlocked with each other, it is possible to reliably produce a time lag to thereby further suppress early closing. Here, the direct interlock between the first valve element and the second valve element means that the first valve element and the second valve element are fixed, locked, or connected to the same part so that they operate in synchronization with each other.

Preferably, the second valve element closes the second drain port after the first valve element closes the first drain port. In this way, even when the first valve element which moves up and down in synchronization with the float closes earlier than the second valve element before the electrolyte solution level rises to the prescribed level, the first valve element can return and reliably carry out vertical movement according to vertical movement of the float until the water addition is completed.

Preferably, the second valve element contains a spherical body having a greater specific gravity than the water and movable in the valve chest and closes the second drain port from above and the first valve element moves up and down in synchronization with the vertical movement of the float, closes the first drain port from below when the first valve element is at an uppermost portion, and prevents the second valve element from closing the second drain port when the first valve element moves down. Here, when the first valve element prevents the second valve element from closing the drain port, it means that, because a space occupied by the first valve element when the first valve element does not close the first drain port (the valve is open) and a space occupied by the second valve element when the second valve element closes the second drain port (the valve is closed) overlaps each other, the second valve element cannot occupy the position for closing the second drain port and that the second valve cannot be closed when the first valve is open.

As a result, because the first valve element interlocked with the float prevents closing of the second valve when the electrolyte level is low, the second valve is not closed when the first valve is open. Even if the first valve is instantaneously closed for some reason, there is a short lag before the second valve is closed. Therefore, the first valve is more likely to restore the open state and the effect of suppressing the early closing due to provision of the plurality of valves is exerted more reliably. By controlling opening and closing of the second valve by utilizing the first valve element, it is unnecessary to physically connect the second valve element and the float and it is possible to further simplify structures of the valve chest and the entire water addition plug. By forming the second valve element into the spherical body movable in the valve chest, it is possible to simplify the structures of the valve chest and the entire water addition plug.

Preferably, the first valve element has a narrower range of vertical movement than the float and is interlocked with the float only when the float is near an upper limit of the range of movement. By reducing the range of movement of the first valve element in this manner, it is possible to reduce the valve chest in size.

Preferably, the first valve element is in a shape tapered downward. In this way, the first valve element moving downward can easily push and move the second valve element when coming in contact with the second valve element.

Preferably, a line of movement of the first valve element and an extension line of the line of movement do not intersect with an imaginary circular cylinder having the second drain port as a base. Here, the line of movement of the first valve element refers to a locus of movement of the first valve element in synchronization with the float. By forming the line of movement of the first valve element in this manner, the early closing is less likely to occur, even when the first valve element is pushed down due to turbulence in a water stream in the valve chest.

Preferably, the water addition plug main body includes a partition plate such that a water stream flowing into the valve chest does not directly hit the second valve element. In this way, the early closing is less likely to occur, even if water supply pressure is high.

Preferably, the water addition plug main body has a water passing path for connecting the water supply port and the water addition port and two or more water pools are formed in the water passing path. By forming the two or more water pools in this manner, it is possible to obtain a high leak preventing effect in the water addition plugs having various water addition control structures.

Preferably, a surface level of the water pool which is the closest to the water supply port out of the two or more water pools is higher than (a) surface level(s) of the other water pool(s). In this way, even when the battery is inclined greatly due to overturning or the like, it is possible to reduce the chance of loss of the water of all the water pools at once.

Preferably, the water addition plug main body has a through hole, which is formed through an inside and through which a surface of electrolyte solution in the container is directly accessible, and a vent passage extending beside the through hole to communicate with an outside. With this structure of the vent passage, it is possible to form the water addition plug having the through hole and with a small amount of leakage of the electrolyte solution.

Preferably, a droplet obstructing member is formed at an upper portion of the vent passage. Preferably, a vent communicating with the outside is formed in the upper portion of the vent passage and the droplet obstructing member is formed in a plate shape facing an entire area of the vent. More preferably, the vent passage has a vertical portion and the droplet obstructing member and the vent are formed at an upper portion of the vertical portion. With this structure, it is possible to further reduce the amount of leakage of the electrolyte solution.

According to another aspect of the invention, there is provided a storage battery including the water addition plug for the storage battery according to any one of the above-described aspects.

In the storage battery according to the aspects of the invention, by suppressing malfunction of the water addition plug, it is possible to accurately restore a prescribed electrolyte level in the container.

Advantage of the Invention

According to the water addition plug in the invention, the early closing is less likely to occur before the prescribed electrolyte level is restored.

MODE FOR CARRYING OUT THE INVENTION

Next, an embodiment of the present invention will be described. In the embodiment, a water addition plug mounted to a lead-acid battery will be described as an example.

Figure 1:
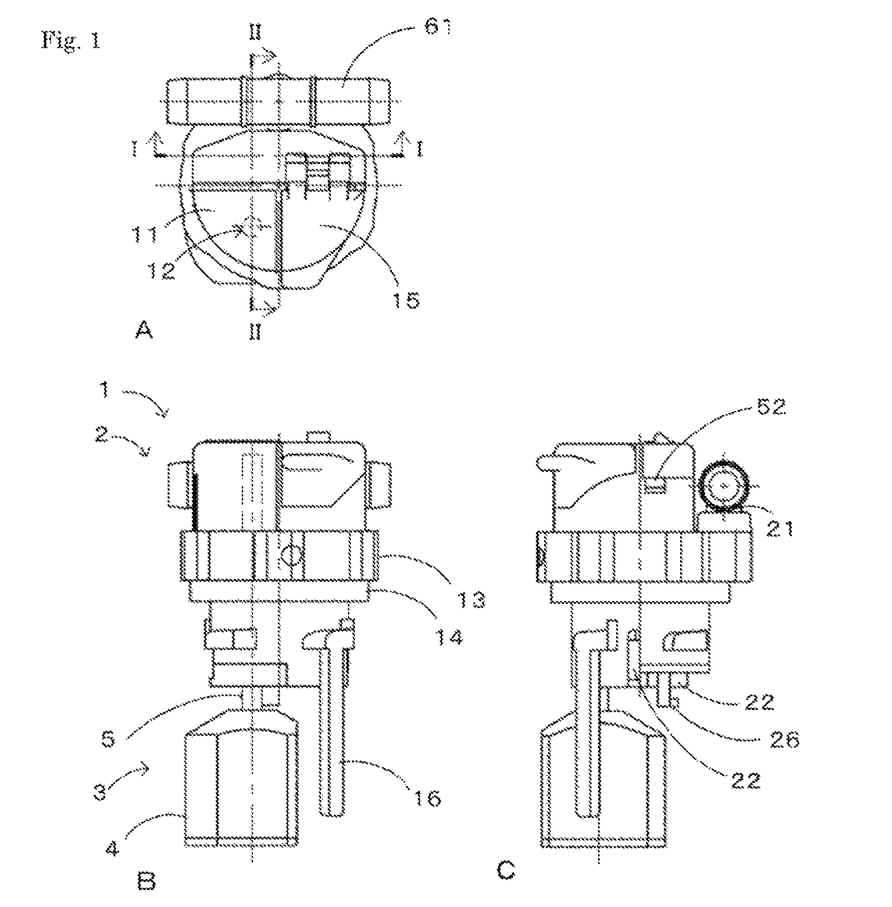
FIGS. 1A to 1C are a plan view, a front view, and a side view of a water addition plug according to an embodiment of the invention.

FIGS. 1A to 1C show an overall structure of the water addition plug in the embodiment. FIG. 1A is a plan view, FIG. 1B is a front view, and FIG. 1C is a right side view.

The water addition plug 1 in the embodiment is formed by a water addition plug main body 2 and a float 3. The water addition plug 1 is used while mounted to a vent provided to a battery lid of a vented storage battery. A portion lower than a flange portion 13 of the water addition plug 1 is inserted into a container through the vent to maintain sealing between packing 14 and the battery lid.

An upper portion of the water addition plug main body 2 exposed on the battery lid is provided with a water supply port 21 through which water supplied from outside flows into the water addition plug. A water swivel 61 is connected to the water supply port 21 and the water swivels 61 of the water addition plugs mounted to the plurality of batteries are connected to each other by tubes and therefore water can be added at once.

A portion of an upper face of the water addition plug main body 2 is formed as a transparent cover 11 so that an electrolyte level indicator 12 indicating an electrolyte level can be observed. At a portion of the upper face of the water addition plug main body 2, a specific gravity measurement port cap 15 which closes a through hole used for measurement of specific gravity of electrolyte solution and the like and which can be opened and closed is provided. In a side face of the upper portion of the water addition plug main body 2, a vent 52 for exhausting gas generated in the battery is formed.

At a portion of the lower portion of the water addition plug main body 2 to be inserted into the container, a water addition port 22 for discharging water to be added into the container is formed. The water addition plug in the embodiment is designed so that water falling from the water addition port 22 does not directly splash on a float main body 4. The float main body 4 is not positioned directly under the water addition port 22 at the center of FIG. 1C. Under the right water addition port 22 in FIG.1C, a splash proof 26 is provided. A sensor fixing rod 16 used for fixing a specific gravity sensor for the electrolyte solution or the like is integrally molded with the main body 2.

The float 3 includes a float main body 4 and a float shaft 5 fixed to the float main body. The float 3 moves up and down following the electrolyte level in the container by utilizing buoyancy of the float main body 4. In the embodiment, an upper end of the float shaft 5 serves as the electrolyte level indicator 12.

Figure 2:
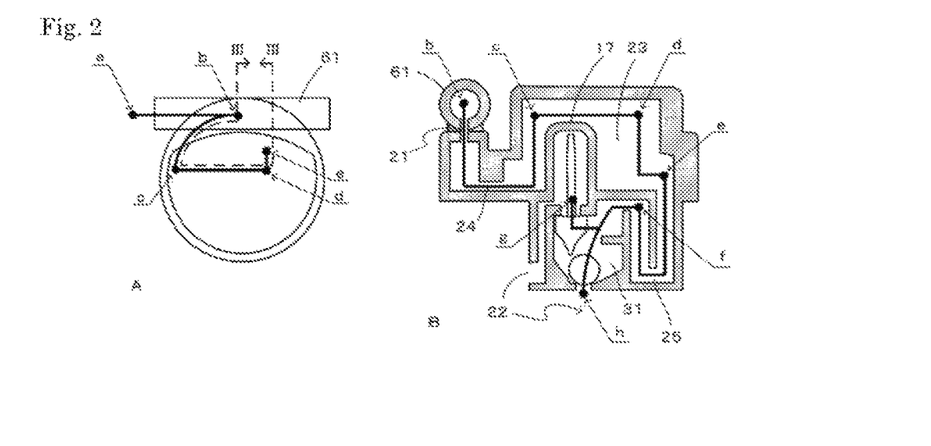
FIGS. 2A and 2B show a water passing path in the water addition plug according to the embodiment of the invention.

FIGS. 2A and 2B show a flowing water path in the water addition plug main body 2 in the embodiment. FIG. 2A is a plan view of the water addition plug. FIG. 2B shows a section along broken line III in FIG. 2A.

In FIGS. 2A and 2B, the water supplied from outside (a) passes through a water swivel 61 (b) and flows into the water addition plug through the water supply port 21. Then, the water passes through a first U-shaped channel 24 (c), flows over a valve chest upper partition wall 17, and flows into an upper water passing chamber 23. Then, the water flows downward from a substantially opposite side (d, e) of the upper water passing chamber 23, passes through a second U-shaped channel 25 (f), and flows into a valve chest 31. Then, when the valve is open, the water is discharged from the valve chest 31 (g, h) and discharged from the water addition port 22 into the container.

Figure 3:
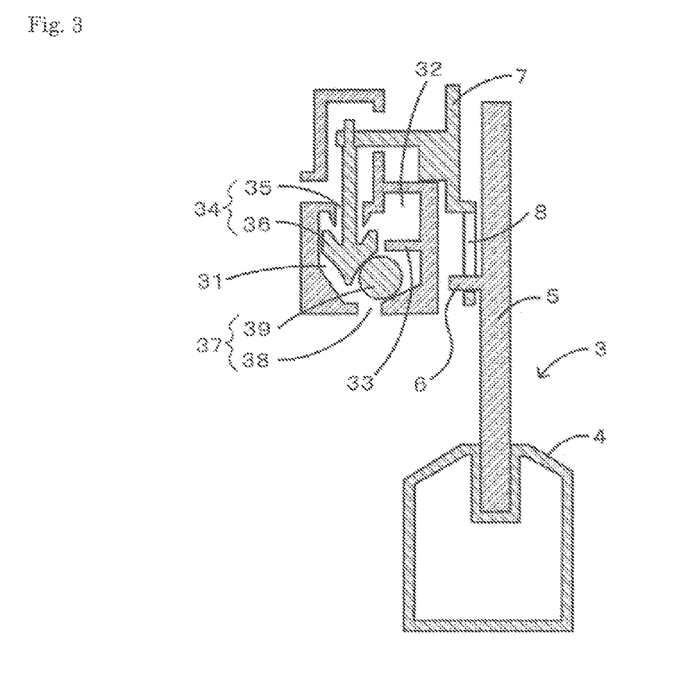
FIG. 3 shows structures of valves of the water addition plug according to the embodiment of the invention.

FIG. 3 shows valves and a structure around the valves. Although centers of three members, i.e., the float 3, the first valve 34, and the second valve 37 are not in the same plane in the water addition plug in the embodiment, FIG. 3 shows the three members in the same section in order to describe relationships between them.

In FIG. 3, the two valves 34 and 37 are provided in the valve chest 31. The first valve 34 is formed in a ceiling of the valve chest and includes a first drain port 35 through which the water from the valve chest is discharged upward and a first valve element 36 for closing the drain port 35 from a side of the valve chest. To a peripheral edge of the first drain port 35, a valve seat such as packing may be fixed.

The second valve 37 includes a circular second drain port 38 which is formed in a bottom face of the valve chest 31 and through which the water from the valve chest is discharged downward and a spherical second valve element 39 for closing the drain port 38 from the side of the valve chest. To a peripheral edge of the drain port 38, a valve seat such as packing may be fixed. The second valve element 39 is a spherical body made of synthetic resin, freely movable in the valve chest, and having a greater specific gravity than water. The second valve element 39 may be made of material having rubber elasticity. The bottom face of the valve chest is gently sloped downward toward the second drain port 38 and the second valve element can move toward the second drain port 38 by gravitation to close the second drain port 38. At a lower portion of a water inlet 32 of the valve chest 31, a partition wall 33 is provided so that the water stream does not directly hit the second valve element 39. The drain ports 35 and 38 communicate with the water addition port 22 for adding the water into the container (FIGS. 1A to 2B).

Sizes of the two drain ports with respect to each other are not especially limited. In the embodiment, the sizes of the drain ports are set so that an amount of water discharged from the second drain port 38 is larger than that from the first drain port 35, which is preferable because the water stream in the valve chest 31 weakens a force for pushing up the first valve element 36. Moreover, because the second drain port 38 is circular, it is easier to obtain a large drainage amount than with other shapes. Because the second drain port 38 is formed in the floor face of the valve chest 31, the gravitation facilitates drainage and therefore it is easy to set a large drainage amount. With these effects, it is possible to increase the drainage amount from the second drain port 38 in the water addition plug in the embodiment to thereby shorten time required for water addition operation.

The first valve element 36 is connected to a connecting member 7 outside the valve chest 31, and the valve element 36 and the connecting member 7 integrally move up and down. The first valve element 36 is in an arrow shape tapered downward. The float main body 4 and the float shaft 5 of the float 3 are connected and move up and down as the whole float 3. In a lower portion of the connecting member 7, an elongate hole 8 which is long in a vertical direction is formed, and a protruding portion 6 on a side face of the float shaft 5 is inserted into the elongate hole 8. With this structure, the valves 34 and 37 are directly or indirectly interlocked with the float 3, and the water addition into the container is controlled. This operation will be described later.

Figure 4:
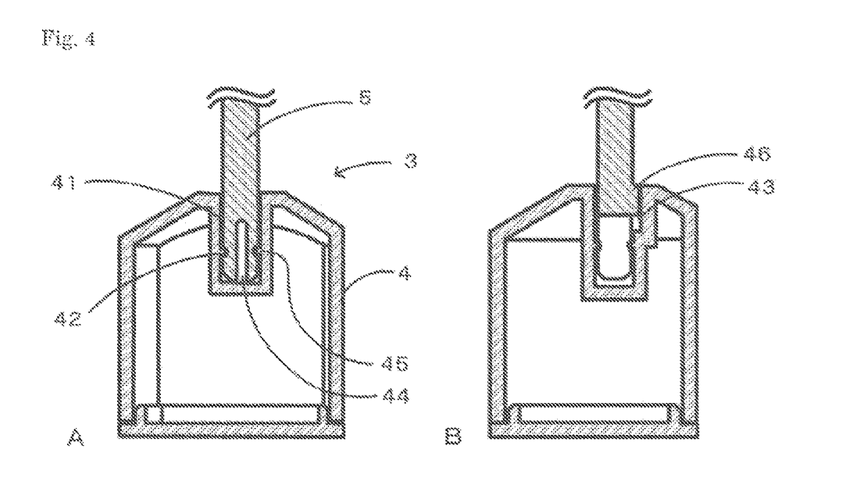
FIGS. 4A and 4B show an assembled structure of a float of the water addition plug according to the embodiment of the invention.

FIGS. 4A and 4B show an assembled structure of the float main body 4 and the float shaft 5 and are sectional views including the float shaft 5. FIG. 4A is the sectional view from a left side and FIG. 4B is the sectional view from a front side in FIG. 1A.

The float main body 4 has a hollow structure. In the embodiment, the float main body 4 is produced by welding two parts made of polypropylene (PP) by ultrasonic welding. A substantially circular cylindrical hollow 41 is formed in an upper portion of the float main body 4. On an inner face of the hollow 41, a circumferential ridge 42 at a middle portion in a depth direction and a vertical groove 43 extending vertically from an upper end are formed. A lower end of the float shaft 5 is split into two by a slit 44. On the float shaft 5, a circumferential recess 45 is formed near the lower end and a protrusion 46 is formed above the slit 44.

In assembling the float 3, the float shaft 5 can be inserted over the ridge 42 of the hollow 41 in the float main body 4 due to existence of the slit 44. Furthermore, the ridge 42 is engaged with the recess 45 and the protrusion 46 is fitted in the groove 43. In this way, it is possible to easily and reliably fix the float main body 4 and the float shaft 5 to each other to thereby prevent falling off of the float shaft 5 and horizontal rotation of the float main body 4.

Figure 5:
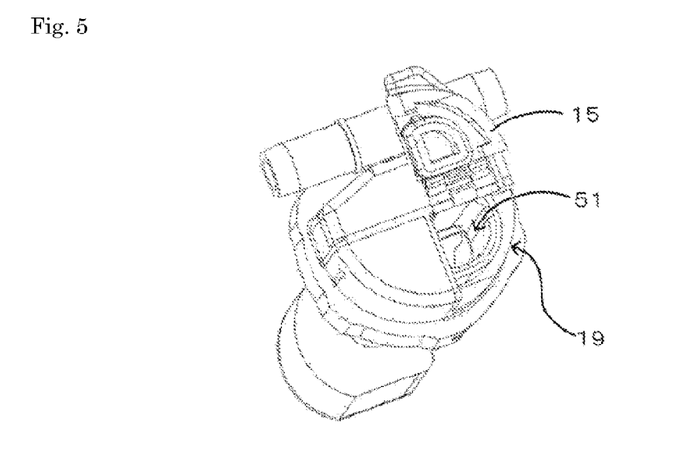
FIG. 5 shows a specific gravity measurement port of the water addition plug according to the embodiment of the invention.

FIG. 5 shows a state in which the specific gravity measurement port cap 15 on the upper face of the water addition plug 1 is open. A specific gravity measurement port 51 is formed under the specific gravity measurement port cap 15. The specific gravity measurement port 51 is used in measuring specific gravity of the electrolyte solution and is a through hole through which a surface of the electrolyte solution in the container is directly accessible. Here, "to be directly accessible" means that the electrolyte solution can be taken or a hydrometer or a thermometer can be inserted to inspect a state of the electrolyte solution through the specific gravity measurement port 51 in a state in which the water addition plug is mounted to the lid of the battery.

When the battery is used, many droplets deposit on an upper portion of the specific gravity measurement port 51 or a back face of the cap 15 due to splash of the electrolyte solution or condensation of vapor of the electrolyte solution. In the meantime, hydrogen gas and oxygen gas are produced by electrolysis of water during charge of the vented battery. At this time, if sealing performance of the cap 15 is insufficient, the droplets of the electrolyte solution are blown by the gas and brown out through a clearance between the cap 15 and the water addition plug main body 2 in some cases. In the embodiment, however, the specific gravity measurement port cap 15 is made of elastomer having rubber elasticity, which improves the sealing performance of the cap 15 and suppresses blowing out of the electrolyte solution.

Figure 6:
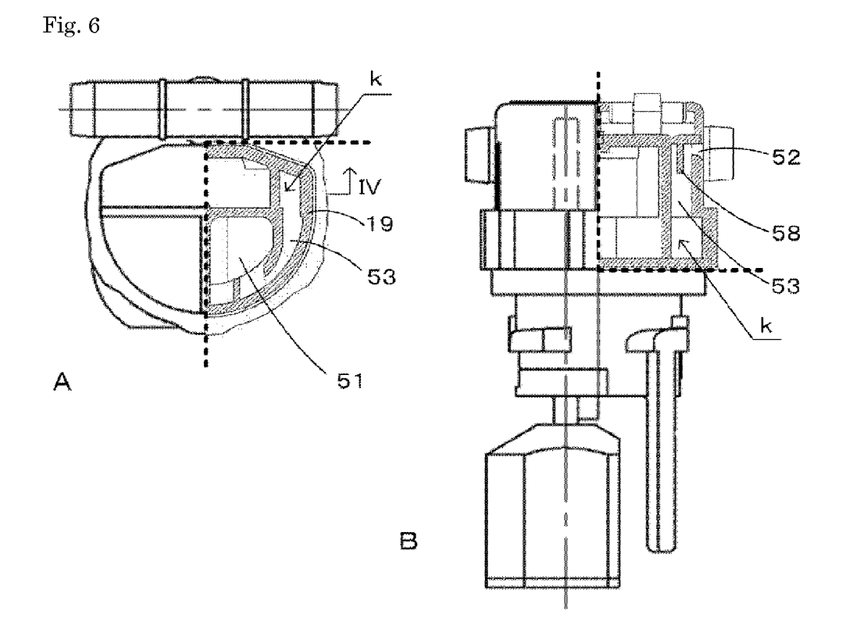
FIGS. 6A and 6B show a vent passage of the water addition plug according to the embodiment of the invention.

FIG. 6A and 6B show a vent passage formed in the water addition plug. A sectional view part of FIG. 6A shows a section a little above the flange portion 13 in FIG. 1A. FIG. 6B shows a section along line IV in FIG. 6B.

In FIG. 6A, the vent passage 53 is formed to extend from a side of the specific gravity measurement port (through hole) 51 along a peripheral wall 19 of the water addition plug. After extending through a substantially horizontal portion 55 formed through about a quarter of a circumference of a water addition plug peripheral wall 19 (k), the vent passage 53 passes through a vertical portion 57 extending upward from "k" as shown in FIG. 6B and communicates with an outside of the water addition plug through a vent 52 at an upper portion. The vent 52 is formed at an upper end of the vertical portion 57 and communicates with the outside of the vent plug. To an upper end of a vertical portion 57, a shielding plate 58 vertically suspended from an upper portion is provided to face an entire area of the vent.

Due to the improved sealing performance of the cap, most of the droplets of the electrolyte solution depositing on the upper portion of the through hole 51 and the back face of the cap 15 pass through the through hole and drop into the container and gas produced by the electrolysis of water passes through the vent passage 53 and is emitted outside through the vent 52.

A sectional area of the vent passage in the embodiment is about 4 mm×5 mm to 4 mm×15 mm. The sectional area of the vent passage is preferably small in order to make the vent plug compact. However, if the sectional area is excessively small, a film of the electrolyte solution is formed in the vent passage and the film are pushed by the produced gas and pass through the vent passage in some cases. In order to avoid it, height and width of the section of the vent passage are preferably 3 mm or greater. Although the extending direction of the vent passage 53 is not especially limited, the vertical portion 57 is preferably provided between a through hole-side inlet 54 and the vent 52 so that the gas rises through the vertical portion 57 as in the embodiment. This is because it is difficult for the droplets of the electrolyte solution to rise through the vertical portion 57 when the droplets enter the vent passage 53 through the through hole-side inlet 54.

It is preferable that the shielding plate 58 vertically suspended from the upper portion is provided to the upper end of the vertical portion 57 as in the embodiment. Even if the film or the droplets of the electrolyte solution rise(s) through the vertical portion, the shielding plate breaks the film or obstructs rising of the droplets to drop the droplets.

In the embodiment, the vent 52 is provided to the upper end of the vertical portion 57 and the shielding plate 58 is formed into a plate shape facing the entire area of the vent. In other words, when the vent 52 is seen from outside, the shielding plate can be seen throughout an open area of the vent. By shielding the entire area of the vent 52 with the shielding plate in this manner, the electrolyte solution is not directly splashed outside.

Preferably, the lower portion of the vent passage 53 does not have uneven portions and extends substantially horizontally or gently slopes down toward the through hole-side inlet 54. This is because the droplets which have dropped to the lower portion of the vent passage can be returned to the through hole 51.

Next, operation of the water addition plug in the embodiment will be described based on FIGS. 7A to 7C.

Figure 7:
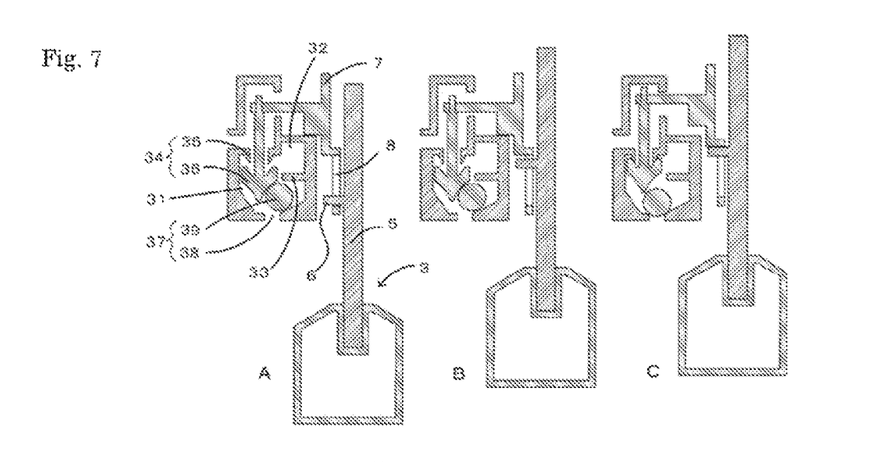
FIGS. 7A to 7C show operation of a valve of the water addition plug according to the embodiment of the invention.

FIG. 7A is the same diagram as FIG. 3 and shows a state in which an electrolyte level is low. When the electrolyte level lowers, the float 3 lowers following it. However, a range of vertical movement of the float 3 is limited in the embodiment and the float 3 stays in a lower limit position of the range of movement when the electrolyte level lowers below a predetermined position. In FIG. 7A, the connecting member 7 is in its lower limit position, the protrusion 6 of the float shaft 5 is supported on a lower end of the elongate hole 8 in the connecting member 7, and, in this way, the float 3 is in the lower limit position.

In the valve chest 31, the first valve element 36 that moves up and down integrally with the connecting member 7 moves down and the first valve 34 is open. The first valve element 36 comes in contact with the second valve element 39 while moving downward. Then, the second valve element 39 is pushed and moved away from the second drain port 38 along a slope forming the arrow of the first valve element 36 and is prevented from closing the second drain port 38. At this time, because the first valve element 36 is tapered downward, it is easy to push and move the second valve element 39. In this state, the water which has entered the valve chest 31 from the water inlet 32 is discharged from the valve chest 31 through the first drain port 35 and the second drain port 38 and added into the container. The water stream from the water inlet 32 hits the partition wall 33 provided below the water inlet and is prevented from directly hitting the second valve element 39.

As the water addition proceeds from the state shown in FIG. 7A, the electrolyte level rises and the float 3 starts to rise following the electrolyte level. At this time, the protrusion 6 of the float shaft 5 rises in the elongate hole 8 in the connecting member 7 and the connecting member 7 and the first valve element 36 still stay in lower limit positions of their ranges of movements until the protrusion 6 reaches the upper end of the elongate hole 8. FIG. 7B shows a state in which the protrusion 6 is close to the upper end of the elongate hole 8. When the water addition further proceeds and the electrolyte level rises, the protrusion 6 pushes up the upper end of the elongate hole 8 and the connecting member 7 and the first valve element 36 start to rise.

FIG. 7C shows a state in which the water addition further proceeds and the electrolyte level reaches a prescribed level again. When the prescribed electrolyte level is restored, the first valve element 36 closes the first drain port 35. In other words, the first valve element 36 moves up into such a position as not to prevent the second valve element 39 from closing the second drain port 38. The second valve element 39 goes down the slope of the floor face of the valve chest 31 toward the second drain port 38 by gravitation and is fitted in the second drain port 38 to close it. Because the first valve element and the second valve element are respectively pushed against their drain ports by the water pressure in the valve chest 31, the two valves are not opened easily and the water addition is reliably stopped.

In other words, the second valve element 39 closes the second drain port 38 after the first valve element 36 closes the first drain port 35. In this way, even if the first valve element 36 which moves up and down in synchronization with the float 3 closes earlier than the second valve element 39 before the electrolyte solution level rises to the prescribed level, the first valve element 36 can return and reliably carry out the vertical movement according to the vertical movement of the float 3 until the water addition is completed.

When the water addition is completed for all the batteries for which the collective water addition is carried out, the water supply is stopped and the water pressure in the valve chest 31 goes away. When the battery is used after that, the water remaining in the water addition plug is discharged through a clearance of the second valve 37 and drops into the container due to vibrations of the whole battery or the electrolyte solution surface. However, the water in the two U-shaped channels 24 and 25 remain as it is (see FIG. 2B). In this way, mist of the electrolyte solution (acid mist) produced inside the battery is blocked by the U-shaped channels.

Next, operation and effects of the water pools in the water addition plug in the embodiment will be described by using FIG. 8 which is the same as FIG. 2B.

Figure 8:
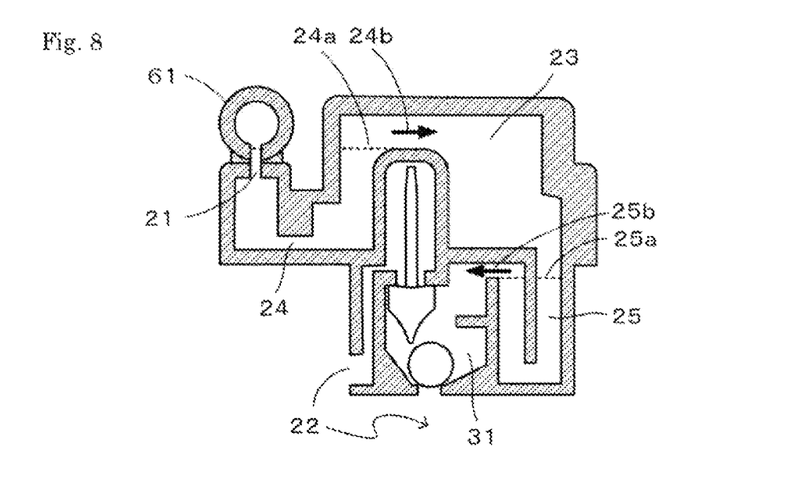
FIG. 8 shows the water passing path in the water addition plug according to the embodiment of the invention.

In FIG. 8, after the completion of the water addition, when the water in the water addition plug drops into the container due to the vibrations of the whole battery or the electrolyte solution surface, the upper water passing chamber 23 in the water passing path and the valve chest 31 are filled with air. However, the water remains in the first U-shaped channel 24 and the second U-shaped channel 25 to form the water pools (hereafter referred to as the first and second water pools with the same reference signs as the corresponding U-shaped channels). In this way, the mist (acid mist) flowing back through the water passing path from the container is trapped in the second water pool 25. When the water in the water addition plug drops into the container, all the water in the water passing path may be discharged at once into the container and the water pool may not be formed in some cases, if a flow path sectional area (sectional area perpendicular to the water stream) of the water passing path is substantially constant and small. To avoid this, a flow path sectional area of the upper water passing chamber 23 is preferably larger than flow path sectional areas of the first U-shaped channel 24 and the second U-shaped channel 25 and more preferably 1.8 times the flow path sectional areas or larger.

In the water addition plug in the embodiment, the second drain port 38 is formed in the floor face of the valve chest 31. Therefore, as compared with the case in which the valve is provided only at the upper portion of the valve chest, the water in the valve chest 31 is swiftly discharged into the container and a path through which the vapor of the electrolyte solution flows back through the valve chest is short. Therefore, when the drain port through which the water from the valve chest is discharged downward is provided, it is especially effective to provide the plurality of water pools in the water passing path to thereby suppress backflow of the mist (acid mist).

In FIG. 8, a water surface 24a of the first water pool 24 is higher than a water surface 25a of the second water pool 25 in the embodiment. Therefore, if the water spills over from the U-shaped channels due to the vibrations or inclination of the battery, the water may move from the first water pool 24 into the second water pool 25, but the water does not move from the second water pool 25 into the first water pool 24. If the mist (acid mist) flows back through the water passing path, it is first trapped in the second water pool which is positioned on a downstream side. Therefore, the water surface 24a of the first water pool is preferably higher than the water surface 25a of the second water pool so that the water does not move from the second water pool 25, which the electrolyte solution reaches easily, into the first water pool 24.

In the embodiment, a direction 24b in which the water is discharged from the first water pool 24 and a direction 25b in which the water is discharged from the second water pool 25 are opposite to each other. In other words, the direction 24b in which the water is discharged from the first water pool is rightward in FIG. 2A, the direction 25b in which the water is discharged from the second water pool is leftward in FIG. 2A, and the directions are opposite to each other. With this structure, even if the battery is greatly inclined as in the case in which the battery overturns, not both of the water pools become empty at the same time and it is highly likely that the water remains in either one of the water pools. Incidentally, the number of water pools is not limited to two but may be three or larger.

Next, effects of the embodiment will be described.

In the prior-art water addition plug described in Patent Document 1, for example, the water from the valve chest is discharged through a single drain port formed in the upper portion. In the embodiment, on the other hand, the water from the valve chest 31 is discharged through the two drain ports 35 and 38. As a result, a stream of drainage water is distributed and therefore the force for pushing up the first valve element 36 is small and the valve 34 is less likely to be closed even if turbulence occurs in the water stream in the valve chest 31.

In the embodiment, both of the two valve elements 36 and 39 close the drain ports 35 and 38 from the side of the valve chest 31. Therefore, when the inside of the valve chest is under the water pressure, the valve elements are pushed against the drain ports and kept in closed states and therefore, once the two valves are closed, the water addition is reliably stopped. Because it is unnecessary to use elastic plates for the drain ports in order to reliably stop the water addition and the drain ports can be directly formed in hard walls of the valve chest, areas of the drain ports can be increased and a degree of freedom in layout of the entire water addition plug is high. It is also possible to provide pieces of packing to peripheral edges of the drain ports if necessary and provision of the packing does not impair these effects.

Furthermore, in the embodiment, because the first valve element 36 and the second valve element 39 are not directly interlocked with each other, there is a short time lag between times when the respective valve elements close. In other words, even if the first valve 34 is instantaneously closed due to a vertical swing of the float 3 caused by the turbulence in the water stream in the valve chest or vibrations and the like of the electrolyte solution surface, there is a short time lag before the second valve 37 is closed. Until the second valve 37 is closed, the first valve element 36 is not strongly pushed against the first drain port 35 due to the water pressure and the first valve element opens again and returns into the original state due to a change in the water stream, swinging back of the float, the vibrations of the valve element, or the like.

In this way, even if the first valve 34 is instantaneously closed, the open state is likely to be restored, i.e., early closing is less likely to occur. Therefore, in the storage battery having the water addition plug 1 of the embodiment, by suppressing the malfunction of the water addition plug 1, it is possible to accurately restore the prescribed electrolyte level in the container.

Figure 9:
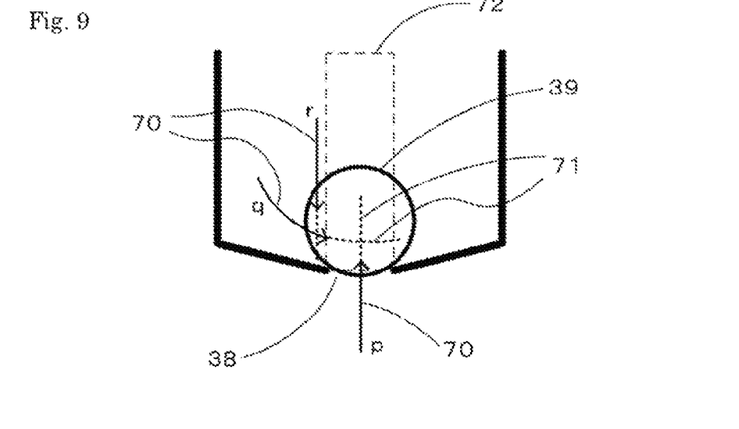
FIG. 9 shows a line of movement of a first valve element of the water addition plug according to the embodiment of the invention.

The structure with which the above-described effect of suppressing the early closing can be generalized in consideration of the line of movement of the first valve element 36. FIG. 9 shows a relationship between the second drain port 38 and the second valve element 39 and a line of movement of the first valve element 36. The line of movement 70 is shown by a solid-line arrow and an extension line 71 of the line of movement is shown by a dotted line.

When the first valve element 36 pushes up the second valve element 39 from below (p), if the second valve element 39 tries to close the second drain port 38, a force for pushing back the first valve element 36 along the line of movement 70 acts and the early closing is likely to occur. When the first valve element 36 pushes away the second valve element 39 sideways (q), if the second valve element 39 tries to close the second drain port 38, a force for pushing back the first valve element 36 along the line of movement 70 acts and the early closing is likely to occur. According to FIG. 9, when the line of movement 70 of the first valve element 36 and the extension line 71 of the line of movement 70 intersect with an imaginary circular cylinder 72 having the second drain port 38 as a base, if the second valve element 39 tries to close the second drain port 38, the force for pushing back the first valve element 36 along its line of movement acts and, as a result, the early closing is likely to occur.

On the other hand, when the first valve element 36 moves down from above to thereby push away the second valve element 39 sideways in the diagram (r) as in the embodiment, even if the second valve element 39 tries to close the drain port 38, directions of a force of the second valve element 39 for pushing the first valve element 36 and the line of movement of the first valve element 36 are totally different from each other and therefore the first valve element 36 is not easily pushed back along the line of movement 70.

Furthermore, in the embodiment, because the first valve element 36 and the second valve element 39 are not directly interlocked with each other, there is a short lag between the time when the first valve element 36 moves up to an upper position and the time when the second valve element 39 closes the second drain port 38. In other words, even if the first valve element 36 instantaneously moves up due to the vertical swing of the float 3 caused by the turbulence in the water stream in the valve chest or the vibrations and the like of the electrolyte solution surface, there is a short time lag before the second valve element 39 closes the second drain port 38. If the first valve element 36 moves down again due to a change in the water stream, swinging back of the float, vibrations of the valve element, or the like during the lag, the original state is restored. As a result, the early closing is less likely to occur.

At this time, the partition wall 33 functions so that the water stream entering the valve chest 31 from the water inlet 32 does not directly hit the second valve element 39 to increase a time lag between the time when the first valve element 36 moves upward and the time when the second valve element 39 is fitted into the second drain port 38.

In the embodiment, the range of movement of the first valve element 36 is set to be smaller than that of the float 3. To put it concretely, the range of movement of the float 3 is 15 mm in the vertical direction. In a range of 10 mm out of the range of 15 mm in which the position of the float is low, the protrusion 6 of the float shaft 5 only moves in the elongate hole 8 in the connecting member 7 and the connecting member 7 and the first valve element 36 do not move. The first valve element 36 moves in synchronization with the float 3 only when the float 3 is within 5 mm from the upper limit of the range of movement. In other words, the first valve element 36 moves in synchronization with the float only when the float is near the upper limit of the range of movement, i.e., when the electrolyte level is close to the prescribed level. By widening the range of movement of the float in this manner, it is possible to widen a range of indication of the electrolyte level indicator 12. In the meantime, by narrowing the range of movement of the first valve element 36, it is possible to reduce the valve chest in size.

The invention is not limited to the above-described embodiment and can be changed in various ways in the scope of the technical idea of the invention.

For example, although the two drain ports are formed in the upper and lower portions of the valve chest in the above embodiment, two drain ports may be formed in any faces of the valve chest. Although the water from the valve chest is discharged upward through the first drain port 35 and the water from the valve chest is discharged downward through the second drain port 38 in the above embodiment, the water from the valve chest may be discharged in any directions through the respective drain ports. The number of valves is not limited to two and may be three or larger. This is because the early closing can be prevented by providing two or more drain ports.

Although the second drain port 38 is circular and the second valve element 39 is in the spherical shape in the above embodiment, the shape of the second valve is not limited to it. For example, a second valve may have a drain port and a valve element in the same shapes as those of a first valve or other various known shapes of valves may be employed. In this case, it is possible to reliably stop water addition if both of the two valves are provided to close drain ports from a side of a valve chest and the early closing is less likely to occur because the two drain ports are provided. Furthermore, if the second valve element is not directly interlocked with the float and the first valve element is formed to prevent the second valve element from closing the second drain port when the first valve element does not close the first drain port, there is a short time lag between times when the two valves are closed and the early closing is less likely to occur as described above, even if the second valve element is not in the spherical shape.

Although the combination of the protruding portion 6 of the float shaft 5 and the elongate hole 8 in the connecting member 7 is used in the above embodiment in order to make the range of vertical movement of the first valve element 36 narrower than the range of vertical movement of the float 3, other methods can be employed. For example, an elongate hole may be formed in a float shaft. 5 or a groove may be formed in place of the elongate hole. A valve element and a connecting part may be molded integrally or the connecting part may include a plurality of parts.

DESCRIPTION OF REFERENCE SIGNS 1 water addition plug
2 water addition plug main body
3 float
4 float main body
21 water supply port
22 water addition port
31 valve chest
34 first valve
35 first drain port
36 first valve element
37 second valve
38 second drain port
39 second valve element

The invention claimed is:

1. A water addition plug for a storage battery, which is for carrying out water addition into a container of the storage battery, the water addition plug comprising:
   a water addition plug main body having a water supply port through which the water is supplied, a water addition port through which the supplied water is discharged into the container, and a valve chest disposed between the water supply port and the water addition port and provided with a first valve and a second valve; and
   a float that moves up and down following an electrolyte level in the container,
   wherein the first valve comprises a first drain port, which is open to the valve chest and communicates with the water addition port, and a first valve element for closing the first drain port in synchronization with a vertical movement of the float, and
   the second valve comprises a second drain port, which is open to the valve chest and communicates with the water addition port, and a second valve element for closing the second drain port.

2. The water addition plug for the storage battery according to claim 1, wherein the first valve element and the second valve element are not directly interlocked with each other.

3. The water addition plug for the storage battery according to claim 1, wherein the second valve element closes the second drain port after the first valve element closes the first drain port.

4. The water addition plug for the storage battery according to claim 1, wherein the second valve element comprises a spherical body having a greater specific gravity than the water and movable in the valve chest and closes the second drain port from above, and
   the first valve element moves up and down in synchronization with the vertical movement of the float, closes the first drain port from below when the first valve element is at an uppermost portion, and prevents the second valve element from closing the second drain port when the first valve element moves down.

5. The water addition plug for the storage battery according to claim 1, wherein the first valve element has a narrower range of vertical movement than the float.

6. The water addition plug for the storage battery according to claim 1, wherein the first valve element is in a shape tapered downward.

7. The water addition plug for the storage battery according to claim 1, wherein a line of movement of the first valve element and an extension line of the line of movement do not intersect with an imaginary circular cylinder having the drain port as a base.

8. The water addition plug for the storage battery according to claim 1, wherein the water addition plug main body comprises a partition plate such that a water stream flowing into the valve chest does not directly hit the second valve element.

9. The water addition plug for the storage battery according to claim 1,
   wherein the water addition plug main body has a water passing path for connecting the water supply port and the water addition port, and
   two or more water pools are formed in the water passing path.

10. The water addition plug for the storage battery according to claim 9, wherein a surface level of the water pool which is the closest to the water supply port out of the two or more water pools is higher than a surface level of the other water pool of the two or more pools.

11. The water addition plug for the storage battery according to claim 1, wherein the water addition plug main body has a through hole, which is formed through an inside and through which a surface of electrolyte solution in the container is directly accessible, and a vent passage extending beside the through hole to communicate with an outside.

12. The water addition plug for the storage battery according to claim 11, wherein a droplet obstructing member is formed at an upper portion of the vent passage.

13. The water addition plug for the storage battery according to claim 12,
   wherein a vent communicating with the outside is formed in the upper portion of the vent passage, and
   the droplet obstructing member is formed in a plate shape facing an entire area of the vent.

14. The water addition plug for the storage battery according to claim 13,
   wherein the vent passage has a vertical portion and
   the droplet obstructing member and the vent are formed at an upper portion of the vertical portion.

15. A lead-acid battery comprising the water addition plug for the storage battery according to claim 1.

* * * * *